United States Patent [19]

Fischer

[11] Patent Number: 5,363,083
[45] Date of Patent: Nov. 8, 1994

[54] TEMPERATURE RESPONSIVE, ELECTRIC OVERCURRENT PROTECTION MODULE

[75] Inventor: Kurt Fischer, Altdorf, Germany

[73] Assignee: Roederstein Spezialfabriken fuer Bauelemente der Elektronik und Kondensatoren der Starkstromtechnik GmbH., Landshut, Germany

[21] Appl. No.: 75,654

[22] Filed: Jun. 11, 1993

[30] Foreign Application Priority Data

Jun. 12, 1992 [DE] Germany .............................. 4219304

[51] Int. Cl.$^5$ .............................................. H01H 37/76
[52] U.S. Cl. ..................................... 337/407; 337/404
[58] Field of Search ................ 337/404, 405, 406, 407, 337/411, 413, 414, 416, 417

[56] References Cited

U.S. PATENT DOCUMENTS

| | | | |
|---|---|---|---|
| 2,817,734 | 12/1957 | Levy | 337/404 |
| 3,763,454 | 10/1973 | Zandonatti | 337/404 |
| 5,055,726 | 10/1991 | D'Entremont et al. | 337/299 |
| 5,105,178 | 4/1992 | Krumme | 337/395 |
| 5,280,262 | 1/1994 | Fischer | 337/407 |

FOREIGN PATENT DOCUMENTS 0352771  1/1990  European Pat. Off. .
1515624  4/1970  Germany .
9012951 11/1990  Germany .

Primary Examiner—Lincoln Donovan
Attorney, Agent, or Firm—Townsend and Townsend Khourie and Crew

[57] ABSTRACT

A temperature responsive electric overcurrent protection module incorporated in an electric circuit on a circuitboard has a PTC resistor which heats up when subjected to an excessive current. Its resistance rises with its temperature to control the current and protect the circuit, including electric components thereof. To protect the circuit against occasionally encountered, large overcurrents, which could damage the circuits and/or cause a burn-out, a thermal switch or overcurrent fuse is provided which comprises an electrically and thermally conductive contact plate, and an associate thermal switch formed by a planar frame secured to the substrate and a spring arm protruding therefrom. The contact plate is spaced from the substrate, and a free end of the spring arm is secured to the contact plate with a heat responsive solder, thereby prestressing the spring arm so that, upon a melting of the solder due to an overheating of the contact plate by the PTC resistor, the spring arm automatically moves away from the contact plate, thereby opening the circuit and preventing damage to it from the excessive overcurrent.

11 Claims, 2 Drawing Sheets

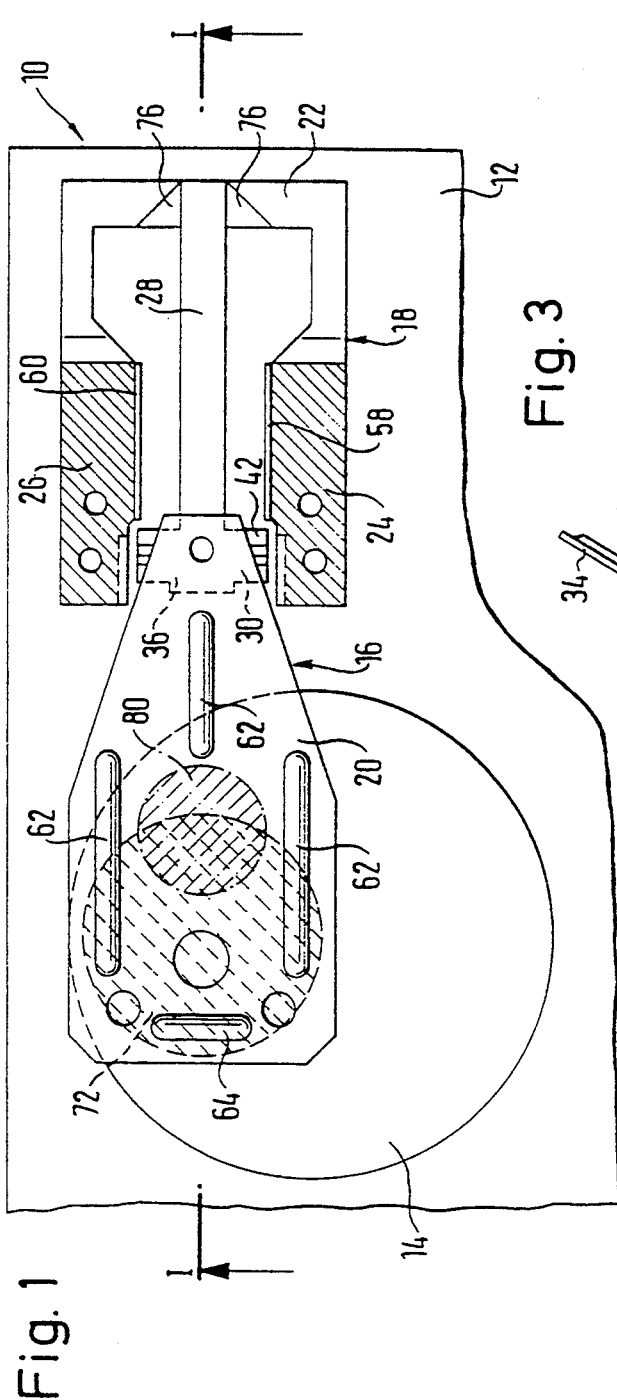
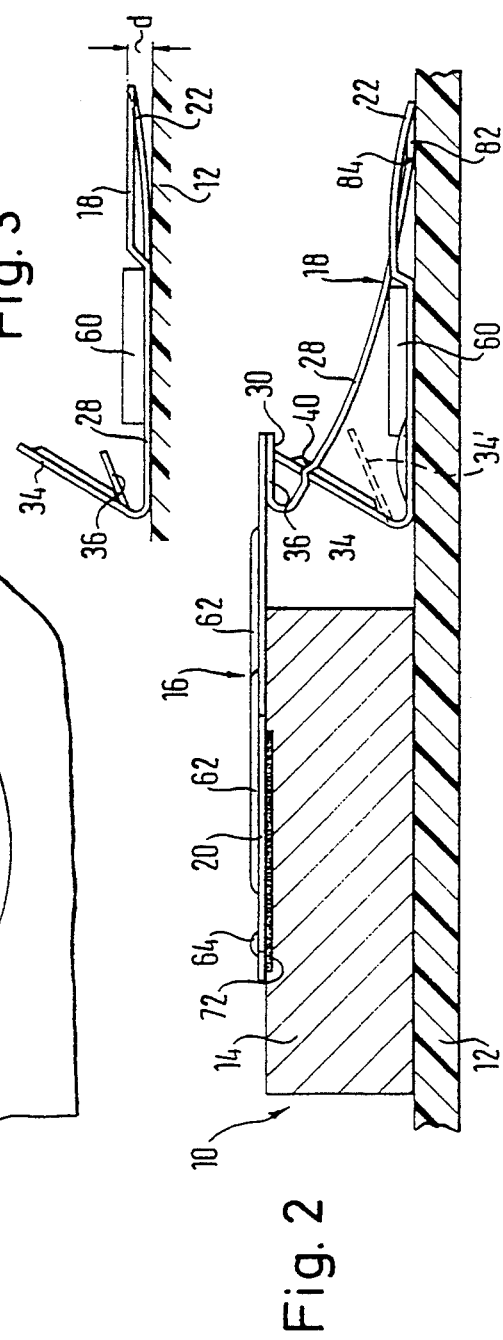

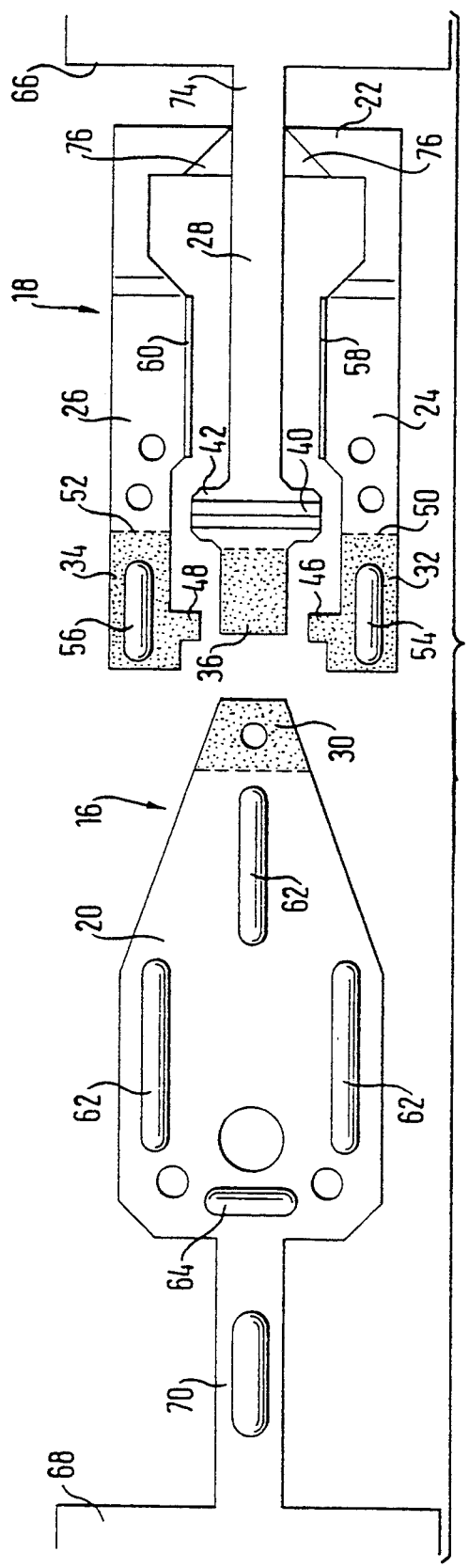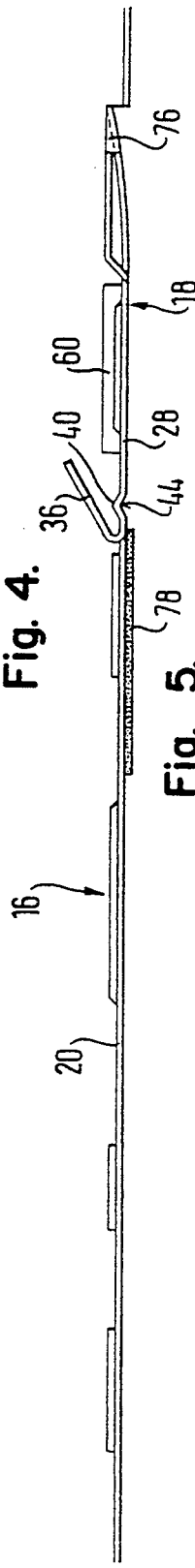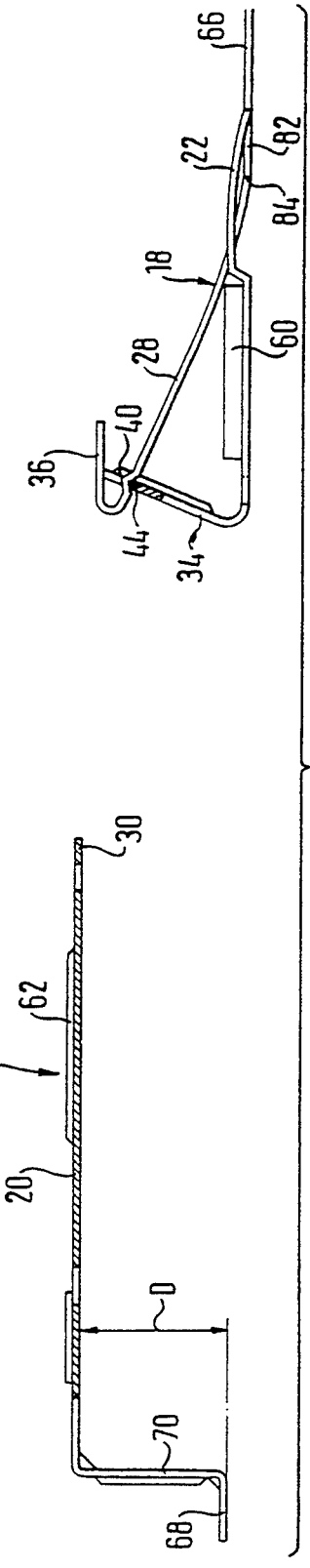
Fig. 4.
Fig. 5.
Fig. 6.

TEMPERATURE RESPONSIVE, ELECTRIC OVERCURRENT PROTECTION MODULE

BACKGROUND OF THE INVENTION

The invention relates to an electrical module comprising circuit parts or components arranged on a substrate or the like and including at least one PTC resistor in an electric circuit which switches between and thereby subjects the circuit to high resistance or low resistance in dependence on the temperature.

In an electrical module of this kind, as known from the published British patent application GB 2 147 480 A, the PTC resistors perform a reversible protective function in that the relevant circuit becomes highly resistive in the event of a fault and subsequently automatically returns to low resistance again. A protection of this kind is however only present with respect to faults which do not exceed the preset load limit of the PTC resistor. When this load limit is exceeded the PTC resistor may be destroyed. Further, the PTC resistor can overheat under such circumstances, which can damage other parts of the module, including the circuit board on which it is mounted.

An electrical module is known from the published European patent application EP 0 352 771 A2 in which a thermal switch or overload fuse is provided in place of a PTC resistor. It consists of a prestressed U- or V-shaped hoop which is fixed via its web to the substrate and has limbs the free ends of which are soldered to a contact surface of the substrate. As soon as the solder softens due to the thermal overload at least one of the two limbs moves away from the relevant contact location as a result of its prestressing, whereby the relevant circuit is interrupted. After the occurrence of such a fault the fuse must therefore be installed anew.

SUMMARY OF THE INVENTION

It is an object of the invention to provide an improved electrical module of the initially named kind. It is in particular an object of the present invention to provide a simple, reliable overvoltage protection for both relatively minor and major faults, and to guarantee a reliable protection against a thermal overload without the need for repairing or replacing the fuse each time.

This object is satisfied in accordance with the invention in that the PTC resistor is connected to the circuit with at least one connection element including a thermal overload fuse. The thermal overload fuse is fixable to the substrate or to the PTC resistor and has at least one prestressed or biased spring arm which is soldered to a contact location of the PTC resistor or to the substrate.

As a result of the connection element for the PTC resistor, which includes an integrated thermal overload fuse, a destruction of the PTC resistor and the danger of ensuing heat damage or fire are prevented. In this manner the substrate and the circuit parts mounted thereon are also reliably protected.

The thermal overload fuse, which also serves to protect the PTC resistor, is configured in such a way that the PTC resistor is timely switched off in the event of an extreme fault so that it does not carry any current to protect it against a complete destruction and burn-out. However, it is permitted to operate so long as the overload is non-critical. In this connection it is in particular also of advantage that the thermal overload fuse does not respond to, for example, voltage peaks which do not damage the PTC resistor.

BRIEF DESCRIPTION OF THE DRAWINGS

FIG. 1 is a schematic plan view of a section of a thick film module or circuit assembly, with the PTC resistor being connected via the associated connection element with the relevant circuit;

FIG. 2 is a section along the line I—I in FIG. 1;

FIG. 3 is a view corresponding to FIG. 2 of the thermal overload fuse of the connection element, the contact generating spring arm of which however is still in its non-stressed starting position; and FIGS. 4 to 6 show the individual steps for the manufacture of the connection element of the invention from a unitary stamped part.

DETAILED DESCRIPTION OF THE PREFERRED EMBODIMENTS

In FIGS. 1 and 2 there is shown a thick film module or assembly 10 which includes a plurality of circuit parts arranged on a substrate 12. Also mounted thereon is a PTC resistor 14 connected via a connection element 16 with an associated circuit which can be switched to be of high resistance or low resistance via the PTC resistor 14 in dependence on the temperature.

The disk-shaped PTC resistor 14 is fixed to the substrate 12 or to the conductive surface provided thereon with an electrically conductive silicon adhesive.

The end face of the PTC resistor 14 which faces away from the substrate 12 is connected via the connection element 16 with the relevant circuit. This connection element 16 includes an integrated thermal overload fuse 18 with a contact generating spring arm 28 which, when installed, is soldered at a contact location 30 to an electrically and thermally conductive plate 20. An electrically conductive adhesive applied in the region 72 secures plate 20 to the end face of the PTC resistor 14. The thermally conductive plate 20 extends beyond the edge of the disk-like PTC resistor 14 and defines the contact location 30 at its free end facing the substrate 12. The thermal overload fuse 18 is arranged between this contact location and the substrate 12.

As can be seen in FIGS. 4 to 6, the thermal overload fuse 18 and also the connection element 16, including the thermally conductive plate 20, initially consist of a unitary stamped part with two lateral holding strips 66, 68. The thermal overload fuse 18 is initially connected via a web 74 with the holding strip 66 while the thermally conductive plate 20 is initially connected via a web 70 with the holding strip 68.

The thermal overload fuse 18 is an essentially planar and U-shaped frame defined by parts 22, 24, 26. It includes a free, central tongue which is connected to the middle web 22 of the frame and forms the spring arm 28. In its relaxed state the central tongue is at least substantially in the plane of the frame (compare FIGS. 3 and 5).

The central web 22 of the U-shaped frame is fixed to substrate 12 by the two limbs 24, 26, is spaced a small distance d from the substrate 12 when the spring arm 28 is relaxed, and it is so kinked or embossed in the region 76 that a free end 36 of the spring arm is biased against the substrate 12 to obtain a slight prestress (compare FIGS. 3 and 5). In the stressed state of the spring arm 28 the middle web 22 is pressed against the substrate 12 as is shown, for example, in FIGS. 2 and 6. In this case the spring arm 28 is supported by its end 82 adjacent the middle web 22 which is in surface contact on the substrate 12. This is achieved with a special kink line 84 in this region of the spring arm (FIGS. 2 and 6). The U-shaped frame is fixed to the substrate 12 via the sections of its two limbs 24, 26 shown in hatched lines in FIG. 1, for example, also by means of an electrically conductive adhesive.

The spring arm 28 is tensioned by raising its free end 36 upwardly out of the plane of the frame. The spring arm 28 is initially held in its stressed state by two support arms 32, 34 which are removed again from the support arm 28, at the earliest, after the spring arm 28 has been soldered to the contact location 30 of the thermally conductive plate 20. Preferably, however, they are removed after the installation of the connection element 16 on the substrate 12 and also on the PTC resistor 14, as is indicated by the broken-line illustration 34' of one support arm in FIG. 2.

In the described embodiment the two support arms 32, 34 are provided at the free ends of the two limbs 24, 26 of the U-shaped frame and they are upwardly bendable about transverse notch lines 50 and 52 for supporting the spring arm 28 in its tensioned position. After the spring arm 28 has been soldered to the contact location 30 of the thermally conductive plate 20, or after the final installation of the connection element 16 on the substrate 12 and on the PTC resistor 14, the support arms 32, 34 are preferably broken off limbs 24, 26 of the U-shaped frame by bending them along notch lines 50, 52. The thermal overload fuse 18 is ready for operation as soon as the free end 36 of the spring arm 28 is released from the support arms 32, 34 and the tensioned spring arm 28 is attached to the thermally conductive plate 20 at the solder location.

To support the tensioned spring arm 28 with support arms 32, 34, the spring arm expediently has a laterally widened section 42 provided with a score line 40 or the like which defines a trough 44. Support lugs 46, 48 project laterally from the support arms 32, 34 and engage the trough of the tensioned spring arm 28 (see in particular FIGS. 2 and 4 to 6).

It can be seen from FIGS. 2, 5 and 6 that the free end 36 of the spring arm 28 is bent in such a way that it is in surface contact with the contact location 30 of the thermally conductive plate 20 when the spring arm 28 is stressed.

Portions of the thermal overload fuse 18 which are not to be bent or scored and the contact element 16, including the thermally conductive plate 20, are at least partly provided with stiffening elements 54 to 64 in the form of embossed areas and/or laterally angled stiffening walls. For example, the limbs 24, 26 of the U-shaped frame have upwardly bent stiffening walls 58, 60 at the inner, longitudinal sides of the sections fixed to the substrate 12. In contrast, the support arms 32, 34 are provided with elongate, embossed stiffening grooves 54, 56.

The thermally conductive plate 20 has, as shown in FIGS. 1 and 4, three longitudinally directed, embossed stiffening areas 62 and, in the region of the web 70, a transversely extending, embossed stiffening area 64.

The U-shaped frame, the spring arm 28, the support arms 32, 34 and also the thermally conductive plate 20 are expediently manufactured from brushed spring bronze, mat nickel-plated and, in the shaded regions illustrated in FIG. 4, also tinned.

The individual manufacturing steps for the thermal overload fuse 18 and the connection element 16, including the thermally conductive plate 20, from a single, stamped part can be seen from FIGS. 4 to 6. After stamping the shape, embossing as well as separating the thermal overload fuse from the thermally conductive plate (FIG. 4), the spring arm 28, which serves as a contact tongue, is shaped, the score line 40 for supporting it is formed, and the embossed feature 76 for generating a slight pre-tension is made (FIG. 5). Furthermore, a layer of solder is applied in the region 78 to the underside of the stamped part.

In accordance with FIG. 6 the left-hand stamped part having the thermally conductive plate 20 is finally angled in the region of the two ends of the web 70 so that the thermally conductive plate 20 is spaced from holding strip 68 a distance D. It is further parallel to the thermally conductive plate 20 and web 70 and has at least substantially the same height as the PTC resistor 14 which is to be mounted on the substrate 12. Furthermore, the spring arm 28 is held in its stressed state by the upwardly bent support arms 32, 34. Thereafter the thermally conductive plate 20 and the thermal overload fuse 18 are assembled and soldered to one another at the contact location 30. The connection elements which are obtained in this manner thus form a coupled arrangement. Before placement on the substrate, for example by means of an automatic insertion or placement machine, the holding strips 66, 68 are severed. During assembly a positioning tool preferably grasps the connection element in a region 80 of the thermally conductive plate 20 (FIG. 1) and places it on substrate 12 or on the PTC resistor. Finally the support arms 32, 34 are bent downwardly away from the contact location 30, as is indicated in FIG. 2 by the support arm 34' shown in dotted lines, and they are preferably separated from the limbs 24, 26 by bending several times back and forth at the notch lines 50, 52.

In other respects the thick layer module 10 can be configured in the manner set forth in the published German application 4,143,095.

It will be appreciated that instead of soldering the spring arm 28 to the element 16 (i.e. to the PTC resistor), and the frame legs 24 and 26 to the substrate, the thermal fuse could be installed the other way round, i.e. with the spring arm soldered to the substrate and the frame legs soldered to the element 16 (i.e. to the PTC resistor).

What is claimed is:

1. A temperature responsive electric overcurrent protection module comprising:
   a printed circuit board including an electric circuit;
   a PTC resistor having first and second end faces and a thickness, said first end face being coupled to said printed circuit board;
   a conductive plate in said electric circuit, thermally conductively attached to said second end face and having a portion projecting beyond an edge of said PTC resistor, said projecting portion defining a contact location on a side thereof facing said printed circuit board;
   a conductive spring arm in said electric circuit having first and second, spaced-apart ends, said first end being secured to said printed circuit board and said second end being spaced from said conductive plate and substantially overlying said contact location thereon when said spring arm is in its relaxed condition; and
   solder material electrically and mechanically coupling said second end of said spring arm at said contact location to said conductive plate so that current can flow between said conductive plate and said spring arm;

whereby a relatively minor overcurrent flow is controlled by said PTC resistor and a relatively major current overflow results in a heating of said PTC resistor, and thereby of said conductive plate, and causes said solder material to melt to permit said spring arm to return to its relaxed condition in which said second end of said spring arm is spaced from said conductive plate and further current flow between said conductive plate and said spring arm is prevented.

2. A temperature responsive electric overcurrent protection module according to claim 1 including an electrically conductive, planar frame secured to the substrate, and wherein the spring arm is integrally constructed with the frame and slopes from the frame to the contact location on the conductive plate.

3. A temperature responsive electric overcurrent protection module according to claim 2 wherein the planar frame comprises a U-shaped, planar frame defined by a central web and spaced-apart legs projecting from the web generally in the direction of the spring arm, and wherein the spring arm is substantially centered between the legs.

4. A temperature responsive electric overcurrent protection module according to claim 3 including a support arm at a free end of each leg of the frame, and holding means on the support arms and the spring arm adapted to position the spring arm so that its free end is substantially in contact with the contact location on the conductive plate while subjecting the spring arm to a prestress biasing the spring arm away from the contact location and towards the substrate.

5. A temperature responsive electric overcurrent module according to claim 4 wherein the holding means includes a laterally widened section and a score line defining a trough on the spring arm, and support lugs projecting laterally from the support arms formed and positioned to engage the trough on the spring arm and thereby place the spring arm in a pretensioned position.

6. A temperature responsive electric overcurrent protection module according to claim 4 wherein the support arms and the respective legs are integrally constructed of the same material, and including means comprising a weakened connection between the support arms and the respective legs so that the support arms can be optionally disengaged from the spring arm and broken off the respective legs.

7. A temperature responsive electric overcurrent module according to claim 1 wherein the second end of the spring arm is substantially parallel to the projecting portion of the contact plate.

8. A temperature responsive electric overcurrent module according to claim 1 including stiffening means on at least one of the conductive plate and the planar frame for inhibiting deflections thereof.

9. A temperature responsive electric overcurrent module according to claim 7 wherein the stiffening means comprises a rib.

10. A temperature responsive electric overcurrent module according to claim 8 wherein the stiffening means comprise an embossed area on at least one of the conductive plate and the planar frame.

11. A temperature responsive electric overcurrent module according to claim 2 wherein the conductive plate, the spring arm and the planar frame are made of spring bronze, and including a nickel coating and a tin coating applied to at least portions of the conductive plate and the planar frame.

* * * * *